United States Patent Office 3,450,107
Patented June 17, 1969

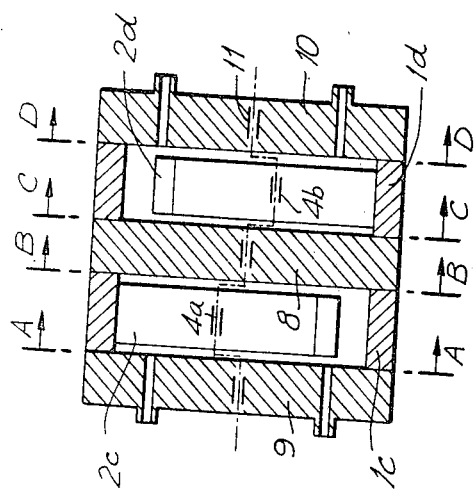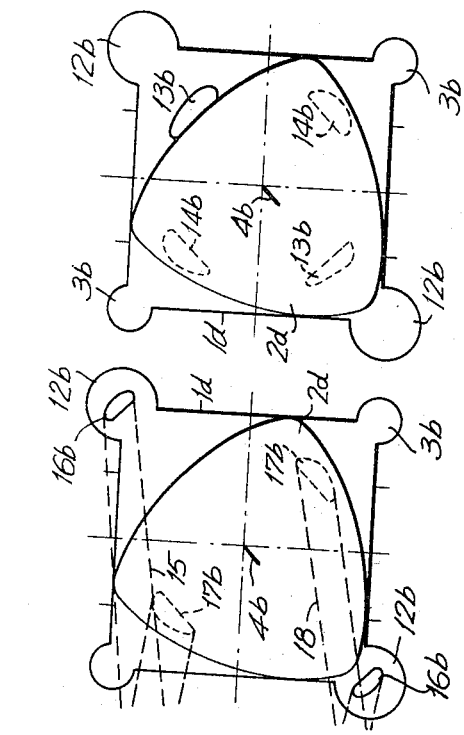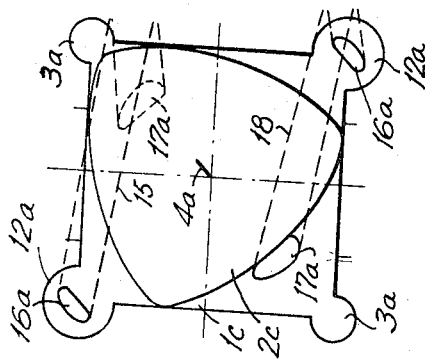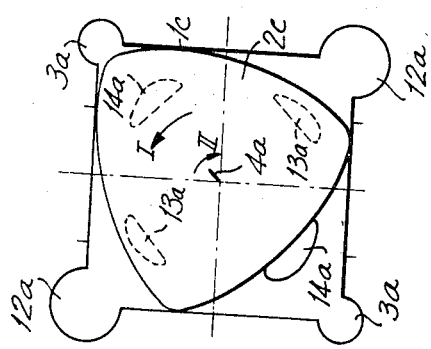

3,450,107
ENGINE OR POWER DRIVEN MACHINE WITH ROTARY PISTON
Maciej Radziwill, Przechodnia 2m1512, and Andrzej Broel-Plater, Tmolnastr. 14/10, both of Warsaw, Poland
Continuation of application Ser. No. 322,580, Nov. 7, 1963. This application Feb. 27, 1968, Ser. No. 708,727
Claims priority, application Poland, Nov. 8, 1962, P 97,565
Int. Cl. F02b 53/08; F01c 1/10
U.S. Cl. 123—8           17 Claims This application is a continuation of application Ser. No. 322,580, filed Nov. 7, 1963 and now abandoned.

The subject of this invention is an engine or a power driven machine with the rotary piston, the cross section of which piston is of the shape formed by the envelope of the operational cylinder walls, in the plane of motion of the said piston.

There are known a number of machine designs comprising rotary pistons and working as internal combustion engines, pumps or compressors, which designs can be in general divided into two groups: machines with pistons provided with a system of sealing elements having the form of gate valves, blades, flaps and the like, which elements are continuously in contact with the cylinder walls as a result of their movements in relation to the piston (for example reciprocating motion of the gate valves, oscillating motion of the blades or flaps, and the like), and the recently introduced machines of the second group in which the piston forms a separate structural element co-operating with the suitably shaped cylinder walls in such a way that particular points of the piston are in continuous contact with the said cylinder walls forming operational chambers of varying volume.

The basic fault of the machines belonging to the first group are the additional dynamic loads connected with the movements of the sealing elements in relation to the rotatory piston, the effect of which dynamic loads is particularly detrimental in the case when the machine is operating at high rotary speeds. There is also another basic fault of the said machines which is caused by the variable ratio of angular speed of the rotary piston to the angular speed of the main shaft, as a result of which there are produced varying loads even when the machine is working at a steady speed.

One of the best known machines of the second group is Wenkel's internal combustion engine (Polish Patent No. 43,628) which engine consists of a cylinder having the shape of a trochoid, while in the said cylinder there is moving with the rotary and eccentric motion a piston of the cross section having the shape of a triangle with convex sides, the vertexes of which triangle are continuously in contact with the cylinder walls. Meanwhile the piston is guided by means of a gear consisting of the stationary internal toothed wheel and the cylindrical toothed wheel moving around inside it, and by means of the crank connecting the said piston with the main shaft of the engine.

The basic fault of the engines belonging to this group is the unfavorable shape of the working chamber formed between a section of the cylinder wall and the operational surface of the piston, and especially the considerable ratio of the outer surface of the said chamber to its volume which results in lowering of the thermal efficiency, in unfavorable combustion process and in considerable thermal conduction losses. Moreover in engines of this kind there are always encountered difficulties with sealing of the working chamber because the sealing elements must be always connected with the rotating piston, as a result of which there are produced variable loading forces causing vibrations of the said sealing elements, their quick wear and the necessity of relatively frequent replacements. As another disadvantage of these engines must be considered the feature that between the sealing elements of the piston and the cylinder surface there occurs only the phenomenon of sliding friction and the connected with it large losses of mechanical energy. Also as one more disadvantage of these engines must be considered large radial components of pressure of the combustion gases on the piston surface, which components produce loads on the shaft bearings and cause the necessity of the corresponding increase of overall dimensions of these bearings.

There is also known, for example from the French Patent No. 1,278,136, the machine with the piston moving with the rotary and eccentric motion, the cross section of which piston has the shape of two semi-circles connected one with the other by means of straight lines, while the cylinder of this machine has the shape of three semi-circles connected by curved lines, the centres of which semi-circles form an equilateral triangle. The above-described shapes of the piston and the cylinder cannot ensure good sealing of the working chambers without the forced movements of the cylinder walls and because of that the said French patent provides movement of the cylinder inside the machine as a result of which the said cylinder forms a kind of an outer rotor, or else—in another alternative of the machine design—the patent provides axial shifting of the elastic cylinder walls moving with the motion kinematically forced by the piston. However it is obvious that both in the first as well as in the second case there cannot be ensured the required by the technical reasons degree of sealing of the working chambers formed between the piston surface and the inner walls of the cylinder, moreover the relative movements of the cylinder or of the cylinder wall elements co-operating with the piston are connected with all the faults of the machines belonging to the first group.

The above faults and disadvantages of the known machines belonging to the said second group are eliminated in the engine or the power driven machine according to the invention, which consists of the cylinder having the shape of a regular polygon, and of the rotating piston moving inside the said cylinder, while the cross section of this piston is formed by the envelope of the co-operating with it elements of the cylinder walls, in the plane of motion of the said piston. Moreover the piston is connected with the main shaft of the machine by means of the crank, and with the machine casing by means of the gear consisting of the stationary internal toothed wheel and the cylindrical toothed wheel moving around inside it.

The working chambers (for example combustion chamber, compression chamber) are placed in corners of the cylinder and have the form of recesses shaped in the most favorable way for the kind of the machine operation, which enables obtaining of the most favorable combustion process and of the best ratio of the chamber surface to its volume. The feature that in the engine according to the invention only parts of cylinder walls (most favorably having the flat surface) are in contact with the rotating piston and not the whole contour of the cylinder, enables to place the sealing elements in the cylinder, and in the simplest case the sealing can be effected by pressing the movable cylinder walls against the piston surface, as a result of which there are eliminated the faults of the known engines, connected with vibrations and with quick wearing of the sealing elements located in the rotating piston.

It is also of advantage for operation of the engine according to the invention that in these sections of the piston movement along which there is produced high pressure of combustion gases and connected with it differences of pressure between different working chambers, the considerable part of movement of the piston in relation to the cylinder has the form of rolling of the piston along the cylinder walls, as a result of which the disadvantageous sliding friction occurring in the hitherto known engines is in the considerable degree replaced by the rolling friction causing marked reduction of the mechanical losses.

An important difference in operation of the engine according to the invention in comparison with the engine according to the Polish Patent No. 43,628 is caused by the more favorable distribution of these forces produced by the pressure of the combustion gases which are acting on the piston, and especially the small value of their radial components acting on the shaft which enables considerable reduction of overall dimensions of the shaft and of its bearings.

The invention is explained in more detail in the drawing in which:

FIG. 14 shows a schematic axial cross section of a two-cylinder engine;

FIGS. 15 to 18 show cross sections of the two-cylinder engine, along lines AA, BB, CC and DD in FIG. 14 to illustrate connections of the working chambers;

Figure 1:
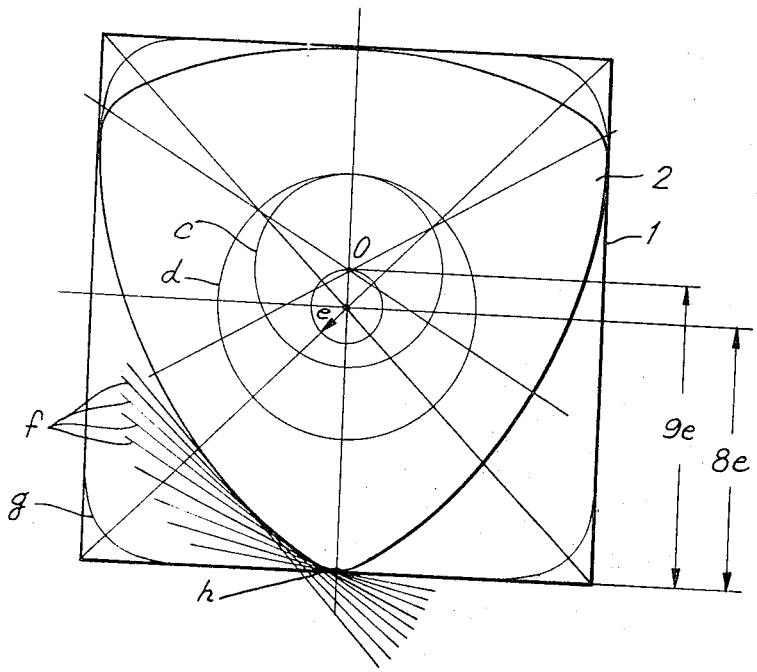
FIG. 1 shows a cylinder of an engine or power driven machine having a square cross section with a piston co-operating with the said cylinder.

The engine or the power operated machine according to the invention consists of the two basic units: the stationary cylinder 1 and of the piston 2 moving in such a way that its center of gravity $o$ draws a circle of the radius $e$ (FIG. 1) and simultaneously it rotates around its own axis. In kinematics this kind of motion can be determined by means of two centrodes, that is the moving centrode $c$ forming the locus of momentary centers of rotation of the piston cross section in the plane of its motion, and the stationary centrode $d$ forming the locus of the said momentary centers of rotation in a stationary reference plane. This kind of motion can be easily produced in practice, for example by means of a gear consisting of the stationary internal toothed wheel and the cylindrical toothed wheel moving around inside it, in which gear the large (outer) pitch circle corresponds to the stationary centrode $d$, and the inner pitch circle corresponds to the moving centrode $c$, while the circular movement of the inner wheel can be obtained by means of the crank connecting the piston 2 with the main shaft of the machine. In this case the value of the crank eccentric is equal to $e$ (FIG. 1).

The principle of the invention is based on the feature that due to the shape of the piston moving with the above-described motion—which shape is formed by the envelope of the positions $f$ of working parts of the cylinder walls in the plane of the piston motion—the said piston is continuously in contact with the cylinder 1 forming in this way the chambers of variable volume which enable operation of the machine working as a pump, as a compressor or as an engine. It is also a characteristic feature of co-operation of these two elements that the cylinder walls do not control the motion of the piston and remain stationary, while the contact is obtained solely as a result of selecting respective geometrical shapes of the piston and the cylinder, and of the kinematics of motion of these two elements. On the FIG. 1 the line $g$ shows a trochoid which is drawn on a stationary plane by the point $a$ of the piston 2 which point is the furthest from the center of symmetry of the said piston. The analysis of geometrical relation between the shape of the piston and of the cylinder has shown that the obtaining of a straight line or convex shape of cross section of the cylinder wall is possible only in the case when the distance between the center of gravity $o$ of the piston and the point $k$ of the piston, which is furthest from the said center of gravity, is larger than $9e$, where $e$ is the value of the eccentricity of the piston motion, which condition is the equivalent of the condition that half a length of the side of the square forming the cross section of the cylinder is larger than $8e$.

Figure 2:
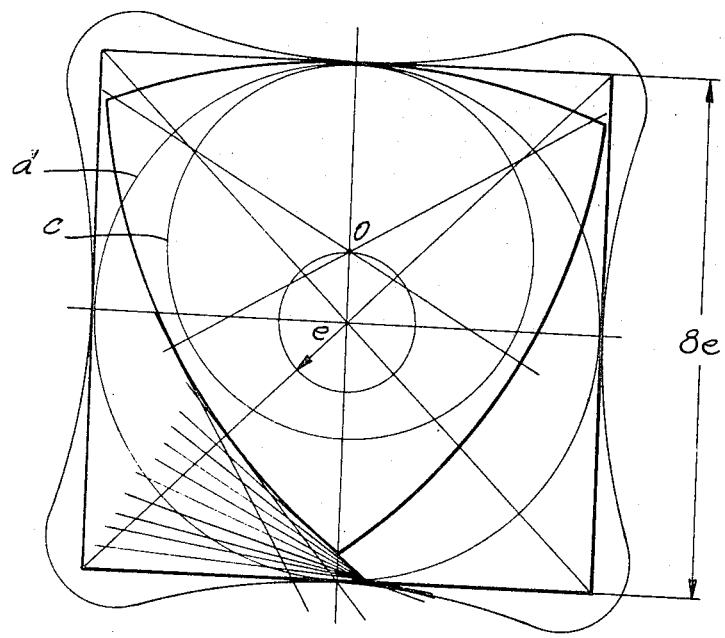
FIG. 2 shows the geometrical construction of a piston having parameters which render impossible obtaining of continuous contact between the said piston and the cylinder.
Figure 3:
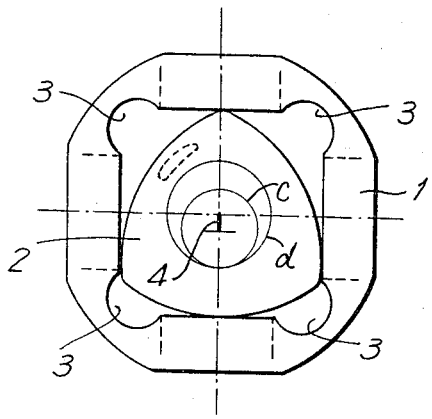
FIG. 3 shows a schematic cross section of a cylinder having the shape of a square, and of the piston co-operating with the said cylinder.

In the case when the above described condition is not complied with (FIG. 2) it is not possible to obtain an envelope of straight line or convex edge 1 of the cylinder wall that would be in contact with the piston 2 at all the positions of the said piston. The second condition which must be complied with to obtain the proper shape of cross section of the piston 2, enabling its proper co-operation with the cylinder 1, is a suitably selected ratio of diameter of the moving centrode $c$ to the diameter of the stationary centrode $d$, that is the ratio of pitch circle diameters in the gear consisting of the stationary internal toothed wheel and the cylindrical toothed wheel moving around it, which ratio must be equal to the ratio of number of sides of the piston cross section to the number of sides of cross section of the cylinder. In the case shown as an example on the FIG. 1 and the FIG. 3 where the cylinder cross section has the form of a square and the piston cross section has the form of a triangle with convex sides, the said ratio must be equal to 3:4.

The shape of the piston cross section obtained in accordance with the above assumptions forms always a closed curve which has a tangent in each of its points (without sharp corners). In the case shown on the FIG. 1 and the FIG. 3 the said curve has the following equations in the system of the rectangular co-ordinates $x$, $y$ connected with the moveable plane:

$$x = \sin \alpha (8e \cos^3 \alpha - K)$$

$$y = -8e \cos^4 \alpha + 12e \cos^2 \alpha + K \cos \alpha - 3e$$

where $\alpha$ is the independent variable in the set of parameters and K is half a length of the square side $a$.

Figure 4:
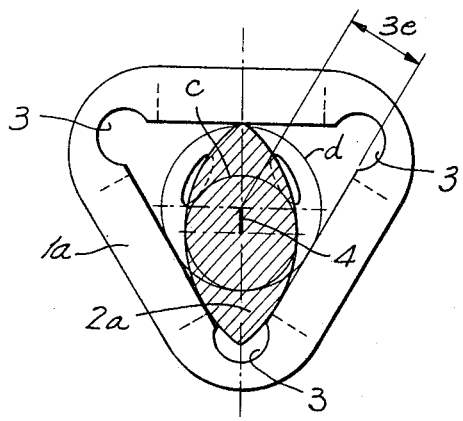
FIG. 4 shows a schematic cross section of a cylinder having the shape of an equilateral triangle, and of a piston co-operating with the said cylinder.

However, the scheme of the cylinder having the square cross section and of the piston of the cross section shape determined by the above given equations of the curve, gives only one alternative of the design according to the invention. On the FIG. 4 there is shown in exemplary way another case in which the cross section of the cylinder $1a$ has the shape of a triangle, and the cross section of the piston $2a$ has the shape of a figure having two convex sides, while the ratio of diameter of the moving centrode $c$ to the diameter of the stationary centrode $d$ is equal to 2:3, and the distance of the geometrical center of the cross section triangle of the cylinder $1a$ from the side of this triangle is equal or larger than $3e$ in order to ensure that the cylinder wall cross section has the form of a straight line or has a convex shape.

Figure 5:
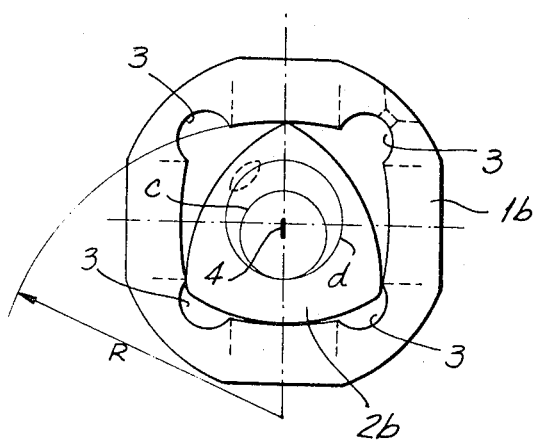
FIG. 5 shows a schematic cross section of a cylinder having the shape of a quadrangle with curved convex sides, and of the piston co-operating with the said cylinders.

In FIG. 5 there is shown still another case, in which the walls of the cylinder $1b$ are formed by sectors of a cylinder having a radius equal to R, while the cross section of the piston $2b$ forms the envelope which is drawn by the edges of walls of the cylinder $1b$ in the plane of motion of the piston $2b$. This curve is similar to the piston cross section described in the case shown in FIGS. 1 and 3 but it has different equation.

In order to obtain proper operation of the machine working as a compressor, as a pump or as an engine, in the corners of the cylinder 1, there are formed recesses 3 of the shape and the size suited to the kind of work of the machine, which recesses together with the spaces enclosed between the walls of the cylinder 1 and the operational surfaces of the piston, form the working chambers of the engine or of the power driven machine.

During the motion of the piston, between its outer surface and the inner surface of the cylinder there are formed the working chambers of variable volume which enable operation of the machine working as a pump, as a compressor or as an engine. In FIGS. 6 to 13 there are shown the particular positions of the piston in the machine according to the invention having a square cross section cylinder provided with two combustion chambers 3, which machine operates as a four-stroke engine with spark ignition and with the valve type timing gear, while during the motion of the piston inside the cylinder there are formed two symmetrical working chambers connected with the combustion chambers 3 and performing the four operational strokes.

Inside each of the recesses 3 forming the combustion chambers (FIGS. 6 to 13) there is located the suction valve 5 and the exhaust valve 6 which are operated by means of a known timing system connected with the engine shaft, and there is also located a spark plug 7 used for igniting of the fuel and connected with the ignition system also operated by means of the timing system. The piston 2 is mounted on the crank 4 or on an eccentric of the main shaft of the engine.

Figure 6:
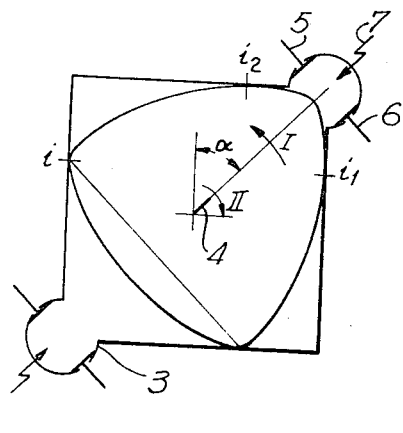
FIGS. 6 to 13 show schematic cross sections illustrating consecutive positions of the rotary piston during operation of a single-cylinder machine.

In FIG. 6 the piston 2 is shown in the position corresponding to the top dead center of the right-hand side top working chamber. When the piston rotates in the direction of the arrow I the shaft and the crank 4 rotate simultaneously in the direction of the arrow II, while the ratio of angular speeds of these motions is equal to $1:(-3)$ which means that for one revolution of the piston 2 there correspond three revolutions in the opposite direction made by the crank and the main shaft of the machine.

In the general case of any shape of the cylinder, in the machine according to the invention—in which the ratio of the radius of the moving centrode $c$ to the radius of the stationary centrode $d$ is equal to $j$—the ratio of angular speed of the crank 4 to the angular speed of the piston 3 is equal to $-j:(1-j)$.

Figure 7:
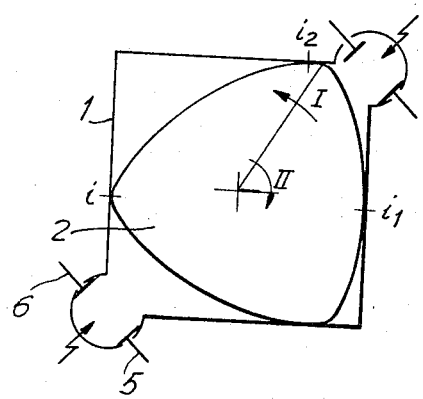

In FIG. 7 the piston 2 is shown in the position turned through the angle of 15° in relation to the position shown on the FIG. 6, as a result of which turning its point $i_1$ of contact with the right-hand side wall of the cylinder has been shifted downwards, and the point $i_2$ of its contact with the upper wall of the cylinder has been shifted to the right, causing an increase of the volume of the working chamber enclosed by the piston surface between the said points, by the cylinder walls and by the upper recess 3. Simultaneously there is opened the suction valve 5 operated by the timing system.

Figure 8:
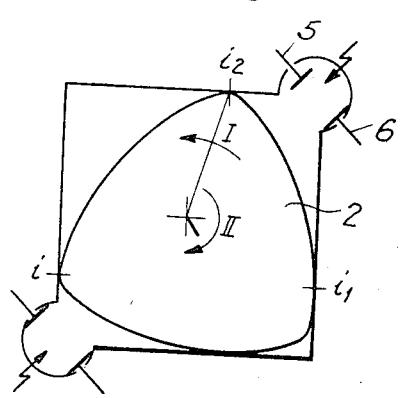
Figure 9:
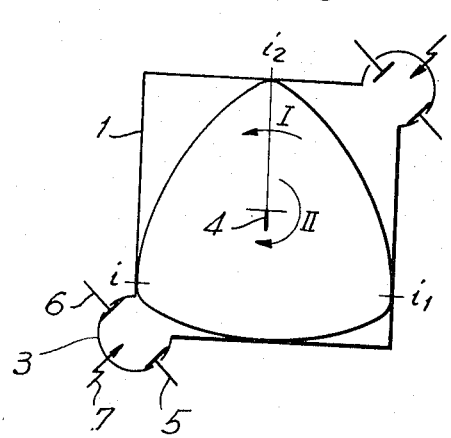

In the positions of the piston 2 shown in FIG. 8 and FIG. 9—which positions correspond to the further consecutive turning of the said piston through the angle of 15°—the point of contact $i_1$ is shifted downwards and the point of contact $i_2$ is shifted to the left-hand side, as a result of which there is effected the further increase of the working chamber and suction of the fuel mixture.

Figure 10:
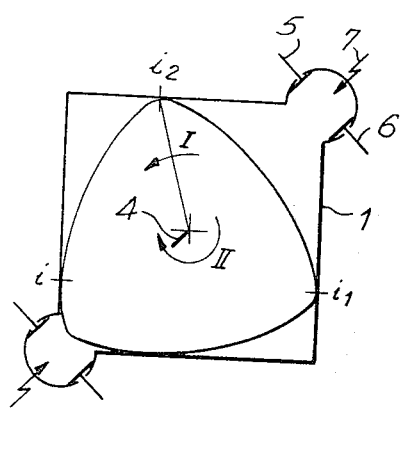
Figure 11:
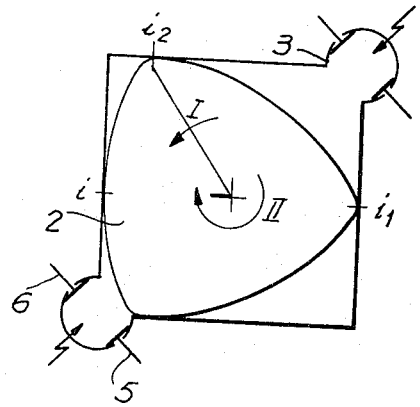
Figure 12:
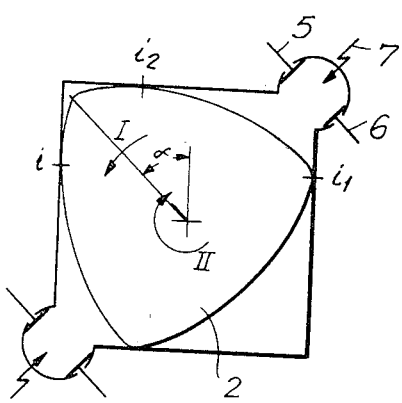
Figure 13:
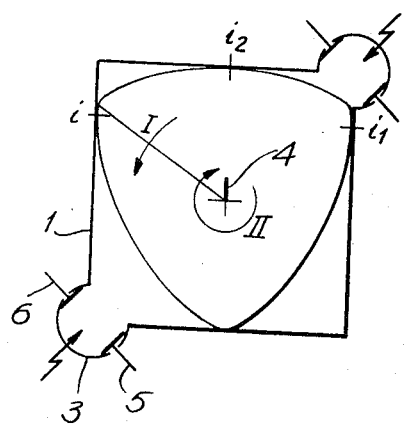

In the position of the piston 2 shown in FIG. 10, which position corresponds to the bottom dead center and in which the said piston is turned through the angle of 60° in relation to the position shown in FIG. 6, the point of contact $i_1$ is already moving slightly upwards and the point of contact $i_2$ continues to move in the left-hand side direction. In this position there is effected closing of the suction valve 5 and also here is the end of the suction stroke (the working chamber reaches here its maximum volume).

In the positions of the piston shown in FIGS. 10, 11, 12 and 13 the point of contact $i_1$ between the piston and the right-hand side wall of the cylinder moves upwards, and the point of contact $i_2$ between the said piston and the upper wall of the cylinder moves in the left-hand side direction, as a result of which the volume of the space enclosed between the outer surface of the piston 2 and the inner surface of the cylinder 1 is reduced and the mixture contained in the working chamber is compressed. As it can be seen from the above, the positions shown in said figures correspond to the compression stroke.

The minimum volume of the working chamber corresponds to the top dead center position of the piston shown in FIG. 6. Near this position there is effected the ignition and combustion of the mixture and also there begins the power stroke during which stroke the volume of the working chamber is increased again as it is shown in FIGS. 7, 8 and 9. In the position shown in FIG. 10 the piston is again in the bottom dead center and this position corresponds to the maximum volume of the working chamber. Near this position the exhaust valve 6 is opened and there also begins the exhaust stroke. In the positions of the piston shown in FIGS. 11, 12 and 13 the volume of the described working chamber is decreased, as a result of which the combustion gases contained in the cylinder are pushed out by the piston through the valve 6 into the exhaust pipe. Meanwhile in the position shown in FIG. 6 a new cycle of operation is begun. Identical cycles of operation are carried out simultaneously in the lower working chamber, and also eventually—if it is possible for thermal reasons—in the working chambers in the remaining corners of the cylinder 1, while in each of these working chambers there is simultaneously carried out a different stroke of the operational cycle. As it can be seen from the above, the operation of the engine shown in FIGS. 6 to 13 corresponds to the operation of a two-cylinder engine of the standard piston type, and in the case when there are used working chambers in all the four corners of the cylinder the operation of the said engine corresponds to that of a four cylinder engine.

The characteristic feature of operation of the machine according to the invention is the motion of the point of contact $i$ between the piston and the cylinder wall. As it can be seen in FIGS. 6 to 13, the said point of contact is moving with reciprocating motion along a part of the cylinder wall, while the analysis of this motion has shown that the length of the active part of the cylinder wall (along which part there is effected the contact between the cylinder and the piston) is equal to the diameter of the stationary centrode $d$, and in the case of the flat cylinder wall the said motion of the point of contact is a harmonic motion.

In a similar way to the above-described and illustrated operation of the machine according to the invention working as a spark ignited engine, it is possible—with application of an injection system and the suitable compression ratio obtained by proper selection of size of the recesses 3—to operate the said machine as a compression ignition engine.

It is an important advantage of the machine according to the invention working as an internal combustion engine, that the position of the piston in the beginning of the power stroke (FIGS. 6 and 7)—at which there are produced the highest pressures of the combustion gases— correspond to comparatively small working surfaces of the piston, which results in comparatively small forces produced by the pressure of the gases acting in these positions on the piston. Also studies have shown that in said positions of the piston the resultant forces acting on the piston are directed so, that their radial components which are transmitted to the bearings, are comparatively small, as a result of which it is possible to reduce accordingly the overall dimensions of the shaft and the bearings, for example in comparison to the engine according to the Polish Patent No. 43,628. The above features are of particular importance in the case of the machine working as a compression ignition engine.

In FIGS. 14 to 20 there is shown another example of the machine according to the invention in which said machine has the form of a two-cylinder internal combustion engine of the valveless type (piston controlled) operating with the two-stroke cycle. The said engine consists of the two cylinders 1c and 1d closed by the common central wall 8 and by the outer face walls 9 and 10 in which is supported in bearings the shaft 11 of the engine. The shaft 11 is provided with cranks or eccentrics 4a and 4b spaced one in relation to the other through the angle of 180°, on which cranks or eccentrics there are rotatably mounted pistons 2c and 2d.

In FIGS. 15 to 18 there are illustrated in a schematic way the respective cross sections AA, BB, CC and DD of the said engine showing one of the positions of the pistons 2c and 2d. One of the cylinders 1c of the engine is provided with the two symmetrical recesses 3a placed on the cylinder diagonal and forming the combustion chambers, and with two recesses 12a placed in the remaining corners and forming the initial compression chambers. The second of the two cylinders 1d (FIGS. 17 and 18) is provided respectively with the two recesses 3b forming the combustion chambers which are placed in opposite corners compared to those in the cylinder 1c, while in the remaining corners there are provided recesses 12b which form the initial compression chambers. In the above arrangement the initial compression chambers 12b of the cylinder 1d are adjacent to the combustion chambers 3a of the cylinder 1c, and the initial compression chambers 12a of the cylinder 1c are adjacent to the combustion chambers 3b of the cylinder 1d.

In the outer face walls 9 and 10 of the engine there are provided inlet holes 13a and 13b and outlet holes 14a and 14b located in such spots of the said walls, that they are opened and closed cylically by the moving pistons 2c and 2d, enabling in this way the valveless timing of the engine. Meanwhile in the central wall 8 there are formed channels connecting the chambers of the both cylinders, i.e. channels 15 connecting the holes 16a in the recesses 12a with the holes 17b in the face wall of the cylinder 1d located in such a way that their opening and closing is controlled by the piston 2d, while channels 18 connect the holes 16d in the recesses 12b of the cylinder 1d with the holes 17a in the face wall of the cylinder 1c, which holes are located in the analogical manner to the holes 17b.

Figure 19:
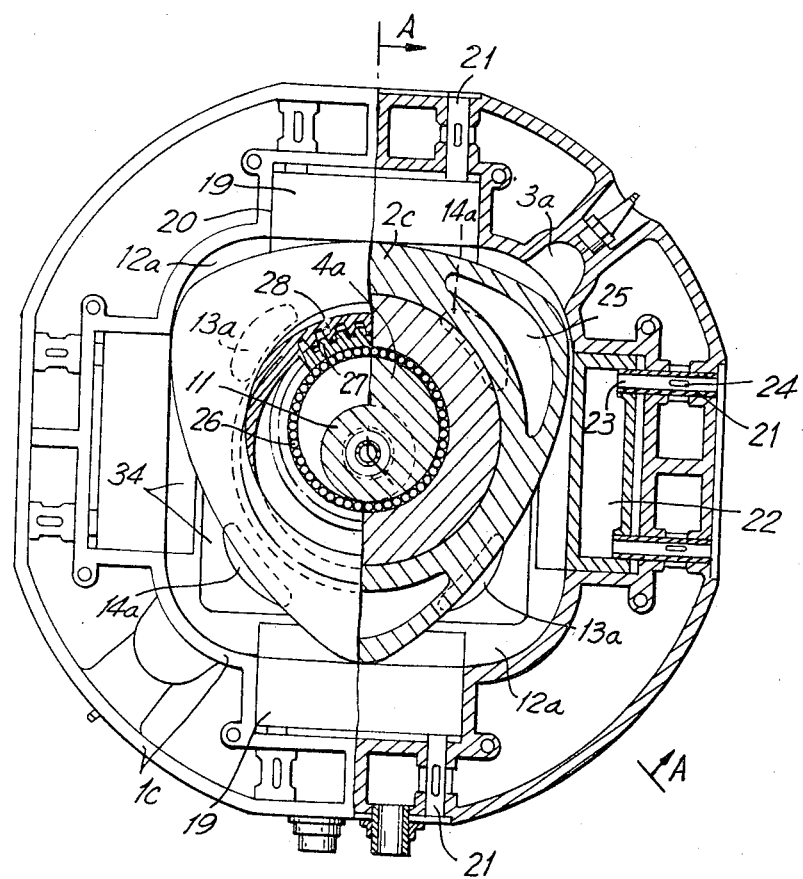
FIG. 19 shows a cross section of a two-cylinder engine along the line CC in FIG. 20.
Figure 20:
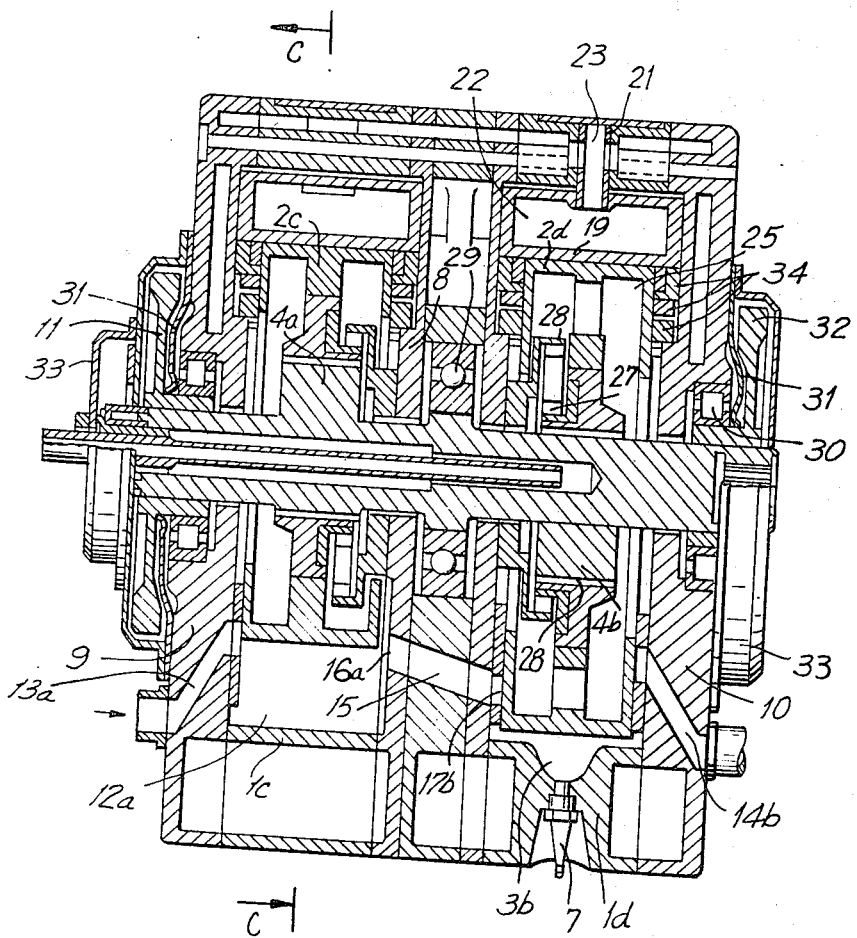
FIG. 20 shows the cross section of the said two-cylinder engine along line AA in FIG. 19.

The engine according to the scheme illustrated in FIGS. 14 to 18 is shown in FIGS. 19 and 20.

In FIGS. 19 and 20, the cylinder is provided with segments 19 which are slidably fitted in seats 20 and are pressed against the working surface of the piston 2. The segments 19 are connected with pins 21 slidably fitted in holes in the body of the cylinder 1, while inside said segments are provided holes 22 connected through holes 23 in the pins 21 and through holes 24 with a cooling system.

The pistons 2c and 2d of the said engine are each provided with recesses 25 decreasing their weight, and are rotatably mounted on cranks 4a and 4b by means of the rolling bearings 26. Inside piston recess 25 there is located a rim 27 of a cylindrical toothed wheel of the above-mentioned gear, which rim is rigidly connected with the piston while its pitch diameter is equal to the diameter of the moving centrode c. Meanwhile the rim 28 of a stationary internal toothed wheel of said gear, is connected rigidly with the central wall 8 separating the two cylinders 1c and 1d.

In FIG. 20 said central wall is of the split type and is provided with a bearing 29 of the shaft 11, which shaft is also supported in bearings 30 mounted in the outer face walls 9 and 10. The bearings 30 are closed from the outside by means of the covers 31. On the shaft 11 there are keyed flywheels 32 screened by means of the guards 33.

In order to seal the working chambers, the walls 8, 9 and 10 are provided with gaskets 34, while adjustment of sealing on the peripheral surface of the pistons is achieved by suitable pressing of the cylinder wall segments 19 against the piston working surface. In the recesses 3b which form the combustion chambers, there are provided spark plugs 7 connected with the ignition system.

The following is the description of operation of the above described two-cylinder engine working with a two-stroke cycle.

When the piston 2c is moving from the position shown in FIG. 15 in the direction of the arrow I, the volume of the top initial compression chamber 12a is increasing, as a result of which—after the inlet hole 13a has been uncovered by the piston—the mixture is sucked from the carburetor. Having passed the bottom dead center position, the piston 2c covers the hole 13a and causes initial compression of the mixture contained in the chamber. The initial compression stroke in the chamber 12a corresponds to such a position (FIG. 17) of the piston 2d in the second cylinder 1d, that the said piston covers the hole 17b of the channel 15 which is connected through the hole 16a with the initial compression chamber 12a, as a result of which the chamber 12a as well as the channel 15 are filled with the initially compressed mixture. Before the piston 2c reaches the top dead center (in the chamber 12a) the edge of the piston 2d (which is then near the bottom dead center) uncovers the hole 17b of the channel 15 and the initially compressed mixture flows into the chamber 3b of the cylinder 1d. During its further motion the piston 2d closes the hole 17b in the central wall 8 cutting off in this way the channel 15 from the working chamber 3b, and as a result of the further decreasing of the volume of this chamber is causes compression of the mixture contained in the chamber. When the piston 2d is near the top dead center the mixture is ignited by means of the spark plug 7 which is placed in the combustion chamber 3b, while the produced combustion gases cause the thrust on the working surface of the piston as a result of which the said piston is set into rotary motion which is transmitted by means of the crank 4b and the toothed wheels 28, 27 of the above-mentioned piston guiding gear to the main shaft of the engine.

After the power stroke has been completed in the upper chamber 3b of the cylinder 1b and before the piston 2d reaches the bottom dead center, the said piston uncovers the outlet hole 14b (FIG. 18) through which the combustion gases flow to the exhaust pipe. After a short while the piston 2d uncovers again the hole 17b of the channel 15 as a result of which the mixture which has been initially compressed in the initial compression chamber 12a is forced through the said channel 15 into the combustion chamber 3b, while the outlet hole 14b is opened for a short moment to enable exhaust of the said chamber. Next, the operational cycle of the working chamber 3b is repeated.

Simultaneously with the above-described operation of the upper initial compression chamber 12a and of the combustion chamber 3b which is connected with it by means of the channel 15, the lower initial compression chamber 12a together with the lower combustion chamber 3b operate in analogous manner, with also the initial compression chambers 12b in the cylinder 1d together with the working chambers 3a in the cylinder 1c connected with them by means of the channels 18 are also operating. As a result of the above, one full revolution of the two pistons 2c and 2d in the cylinders 1c and 1d corresponds to twelve operational strokes, and one revolution of the shaft 11 corresponds to four power strokes.

The valveless timing of the engine has been obtained by providing the inlet holes 13, the outlet holes 14 and the passage holes 17 in the face walls of the cylinder and by opening and closing of these holes by the moving piston, which also allows to uncover with high speed the considerable bores of the holes, that is to obtain large values of the time-bore characteristic of flow, which is particularly advantageous in the case when the machine according to the invention is utilized as a high speed engine.

The above arrangement of the holes also enables to obtain in an easy way the asymmetric timing system which improves operation of the engine working on the two-stroke basis and eliminates in the considerable degree obtain the said asymmetric timing the inlet holes 13a the faults of a standard two-stroke engine. In order to and 13b are located in the outer walls 9 and 10 in such spots that the angular path of the pistons 2c and 2d covered between the moment of opening of the hole 13a or 13b and the moment of reaching the bottom dead center, is larger than their angular path from the bottom dead center to the moment of complete closing of the hole 13a or 13b. Meanwhile the holes 17a and 17b are located in the center wall 8 in such a way that they are opened after the outlet holes 14a and 14b have been previously opened and they are closed after the said outlet valves have been previously closed.

As a result of locating of the cranks 4a and 4b on the opposite sides of the shaft 11, there is obtained the possibility of complete dynamic balancing of the engine by means of two counter-weights connected with the flywheels 32.

The operational cycle of the above-described two-cylinder engine according to the invention corresponds to the operational cycle of an eight-cylinder four-stroke standard piston engine, and ensures smooth operation, much smoother in comparison to the hitherto known engines with rotary pistons. Of course said engine does not exclude other possible designs of the machine according to the inventions, for example the design shown in FIGS. 4 and 5, in which there is preserved the principle of the invention based on obtaining tightly sealed chambers of variable volume between flat or curved walls of a cylinder having a cross section of regular polygon shape, and the piston moving inside the said cylinder, which piston has a cross section forming the envelope of the edge of the cylinder wall in the plane of motion of the piston. In all these designs in the cylinder corners there are provided recesses 3 and 12 forming the working chambers which have the shape and the size selected according to the operation of the machine.

It is also an important feature of the machine according to the invention that it is possible to obtain the required degree of sealing between the working surface of the piston and the cylinder surface by means of radial pressure of the cylinder wall segments against the piston surface.

The machine according to the invention may be utilized as an engine as well as a pump or a compressor.

What is claimed is:

1. A machine comprising a body having an internal surface defining a chamber, a piston in said chamber having relative rotation therein, said piston having peripheral side surfaces which contact the internal surface of the chamber, said chamber being restricted to provide only flat surfaces where it is contacted by the peripheral side surfaces of the piston, said peripheral side surfaces of the piston forming the envelope of the cooperating flat surfaces of the chamber to bound operation chambers therein for a working medium, a drive shaft, said piston being eccentrically and rotatably mounted on the drive shaft, a stationary internally toothed ring gear coaxial with said shaft, and an externally toothed gear coaxial with said piston and internally in mesh with said ring gear to orbit the same upon rotation of the piston such that the latter undergoes movement in the chamber in which the peripheral side surfaces of the piston are in contact with the flat surfaces of the chamber along respective contact surfaces which move reciprocally along the flat surface.

2. A machine as claimed in claim 1, wherein said body is provided with recesses between the flat surfaces thereof.

3. A machine as claimed in claim 1 in which the cross-section of said chamber has basically the shape of a square, and the ratio of diameter of the externally-toothed gear to the diameter of the internally-toothed gear is 3:4, while the length of a side of said square is not less than sixteen times the eccentricity of the piston on the shaft.

4. A machine as claimed in claim 1, wherein said flat surfaces are formed by segments separately mounted for radial movement in said body to provide sealing engagement with the surfaces of the piston.

5. A machine as claimed in claim 4, in which each of said segments has a cavity and channels leading to the cavity for reception of a cooling medium.

6. A machine as claimed in claim 1, wherein said body has a second chamber and piston therein, the pistons being supported on the shaft in 180° eccentric displacement, said body including a central wall separating the two chambers, said chambers being provided with inlet and outlet holes located so as to be covered and uncovered by the pistons during their travel, said central wall being provided with channels connecting the holes of the two chambers in appropriate pairs.

7. A machine as claimed in claim 6 in which the inlet holes are so located in the piston chamber that the piston during its travel moves a greater angular distance between the opening of a hole and arrival at the equivalent of bottom dead center position than it moves from the latter position to the position in which it again closes the hole, and the outlet holes and the holes in said central wall are so located that, during the travel of the piston the outlet holes are uncovered in advance of the holes in said central separating wall, and the latter holes are covered in advance of the inlet holes.

8. A machine comprising a body having an internal surface defining a chamber, a piston in said chamber having relative rotation therein, said piston having peripheral side surfaces which contact the internal surface of the chamber, said chamber having at least substantially flat surfaces where it is contacted by the peripheral side surfaces of the piston, said peripheral side surfaces of the piston, upon being driven, defining an envelope corresponding to the flat surface of the chamber and bounding work chambers in the first said chamber for a working medium, a drive shaft, a crank by which said piston is eccentrically and rotatably mounted on the drive shaft, a stationary internally toothed ring gear coaxial with said shaft, and an externally toothed gear coaxial with said piston and internally in mesh with said ring gear to orbit the same upon rotation of the piston such that the latter undergoes movement in the first said chamber in which the peripheral side surfaces of the piston are in contact with the flat surfaces of the chamber along respective contacts which move reciprocally along the flat surfaces.

9. A machine as claimed in claim 8 wherein said body is provided with recesses between the flat surfaces thereof.

10. A machine as claimed in claim 8 wherein the longest distance from the center of the piston to the periphery thereof is at least nine times the eccentricity of the piston on said shaft.

11. A machine as claimed in claim 8 in which the cross-section of said chamber is generally in the shape of a square, and the ratio of the diameter of the externally-toothed gear to the diameter of the internally-toothed gear is 3:4, the length of a side of said square being not less than sixteen times the eccentricity of the piston on the shaft.

12. A machine as claimed in claim 8 wherein said body comprises segments separately mounted for radial movement to provide sealing engagement with the surfaces of the piston, said segments providing said flat surfaces.

13. A machine as claimed in claim 12, in which each of said segments has a cavity, and channels leading to the cavity for reception of a cooling medium.

14. A machine as claimed in claim 8 wherein said body has a second chamber and piston therein, the pistons being supported on the shaft in 180° eccentric displacement, said body including a central wall separating the two chambers, said chambers being provided with inlet and outlet holes located so as to be covered and uncovered by the pistons during their travel, said central wall being provided with channels connecting the holes of the two chambers in pairs.

15. A machine as claimed in claim 14 in which the inlet holes are so located in the piston chamber that the piston during its travel moves a greater angular distance between the opening of a hole and arrival at the equivalent of bottom dead center position than it moves from the latter position to the position in which it again closes the hole, and the outlet holes and the holes in said central wall are so located that, during the travel of the piston, the outlet holes are uncovered in advance of the holes in said central separating wall, and the latter holes are covered in advance of the inlet holes.

16. A machine of the rotary piston type comprising
a hollow block having walls defining a chamber,
a piston rotatable in the chamber, and defining work chambers therein for an operating medium,
a gear train comprising an internally toothed ring fixed coaxially to the block and an externally toothed gear inside and meshing with the ring and fixed coaxially to the piston.
and a crank shaft having a throw connected to the piston,
The walls of said chamber having working parts of generally rectilinear shape contacting the piston,
said piston being movable in said chamber in combined rotary and eccentric motion constrained by rolling of the gear in the ring,
the outline of said piston being the envelope described by said working parts in contact with said piston as defined by mutual rotation of said ring and gear.

17. The method of preparing a template from which to machine the periphery of a piston for use in the chamber of a rotary piston machine which comprises the steps of:
(a) representing in a fixed plane a first centrode having a radius R,
(b) representing in said plane a second centrode in internal rolling contact with said first centrode and having a radius r,
(c) the ratio r/R defining the kinetic relationship of the piston to the chamber and the difference R−r defining the throw of a crank shaft coaxial with the first centrode and having the piston mounted eccentrically thereon,
(d) representing in said plane a circle concentric with said first centrode and having a radius greater than R defining the maximum outer dimension of the chamber,
(e) representing on said circle a point in alignment with the centers of said two centrodes,
(f) representing in said plane a line tangent to said circle at said point and extending symmetrically to either side of said point signifying a working part of said chamber contacted by said piston,
(g) representing orbital travel of a movable plane parallel to said fixed plane and secured to said second centrode with said second centrode rolling free of sliding movement inside said first centrode,
(h) and reproducing on said movable plane the envelope traced by successive positions of said line during orbital travel thereby to display the periphery of said piston in said movable plane.

References Cited

UNITED STATES PATENTS

| 3,096,746 | 7/1963 | Sollinger. |
| 3,097,632 | 7/1963 | Froede. |
| 3,200,794 | 8/1965 | Peras. |

FOREIGN PATENTS 640,621   6/1962   Italy.

CORNELIUS J. HUSAR, *Primary Examiner.*

U.S. Cl. X.R.

230—145